R. S. FEND.
AUTOMOBILE CONTROL MECHANISM.
APPLICATION FILED JULY 11, 1917.

1,321,904.

Patented Nov. 18, 1919.
8 SHEETS—SHEET 2.

Witnesses:

Inventor
Roland S. Fend
By Williams Bradbury & Lee
Attorneys

UNITED STATES PATENT OFFICE.

ROLAND S. FEND, OF CHICAGO, ILLINOIS, ASSIGNOR TO WOODS MOTOR VEHICLE COMPANY, OF CHICAGO, ILLINOIS, A CORPORATION OF ILLINOIS.

AUTOMOBILE CONTROL MECHANISM.

1,321,904.  Specification of Letters Patent.  Patented Nov. 18, 1919.

Application filed July 11, 1917. Serial No. 179,831.

*To all whom it may concern:*

Be it known that I, ROLAND S. FEND, a citizen of the United States, residing at Chicago, in the county of Cook and State of Illinois, have invented a certain new and useful Improvement in Automobile Control Mechanism, of which the following is a full, clear, concise, and exact description, reference being had to the accompanying drawings, forming a part of this specification.

My invention relates to controlling mechanism and system for automobiles provided with a gasolene engine, a dynamo, and a storage battery for propelling the vehicle.

In my applications, Serial Nos. 26,141; and 36,595, and Patents Serial Nos. 1,244,045 and 1,275,011, I have shown and described various electric circuit arrangements, by means of which a dynamo may be controlled so as to operate either as a motor or a generator at various speeds, and so that the dynamo may be caused to take power from and store power into the storage battery under varying conditions of load and speed. The invention intended to be covered hereby is applicable in many respects to the disclosures in each of the above mentioned prior applications, and in so far as any of the claims of the present application may be based upon the disclosures in the prior applications, the present application is a continuation in part of the prior applications above identified.

The object of this invention is to place within the ready access of an automobile operator such manually operated levers and the like as may be useful in the control of the vehicle when operating purely as an electrically propelled vehicle, when operating purely as a gasolene propelled vehicle, when operating as a partially gasolene and partially electrically propelled vehicle, when dynamically braking the vehicle and storing energy in the battery, and when driving the vehicle in a reverse direction. The engine controlling system and the dynamo controlling system are mechanically connected and physically related so that they coöperate with one another and that each coöperates with the mechanical braking and brake release mechanism of the vehicle.

The arrangement of operating levers is such that the first movement of one of the foot brake levers toward its final braking position acts to cut down the power of the gasolene engine and to increase the motor field magnetization, so that a weak or strong dynamic braking effect may be secured, dependent upon the speed of the car and the degree of depression of the foot brake lever. When the service foot brake is depressed through a certain limited movement all of the dynamic braking effect and a portion of the mechanical braking effect are added, while, when the foot piece of the service brake is tilted to the rear, the dynamic brake effect is relieved and only the mechanical brake continues.

Other features of the invention are a duplicate control system for the dynamo field resistance, by means of which the dynamic brake can be applied without disturbing the setting of the normal dynamo control lever and its mechanism; duplicate control system for the carbureter throttle; interlocking mechanism for the reversing switch to prevent that switch being changed while the resistance is included in the dynamo field circuit, but at the same time permitting the reversing switch to be moved from its forward running position into neutral; coöperating mechanism between the service and operating brake pedals so that either alone or both together they operate a single mechanical braking system; service brake pedal control of the main service switch, and emergency brake pedal control of the main service switch and of the reversing switch.

A particular method by which the vehicle herein described is caused to start from rest by a gradual acceleration insufficient to bring about a too excessive drain upon the battery, is herein described, but forms no part of the invention herein claimed, excepting as such means may coöperate with the mechanical operating levers which control it. Other features of my invention will be more particularly pointed out in the following detailed description of the vehicle to which my invention has been applied.

My invention is illustrated in the accompanying drawings, in which

Figure 1 is a plan of the chassis showing the position of the coöperating controlling and controlled members thereon and their interrelation;

Fig. 2 is an elevation of the chassis showing the same members as illustrated in Fig. 1;

Fig. 2^A is a plan of the steering wheel showing the engine and dynamo controlling levers;

Similar characters of reference refer to similar parts throughout the several views.

Figures 1, 2, 2A:
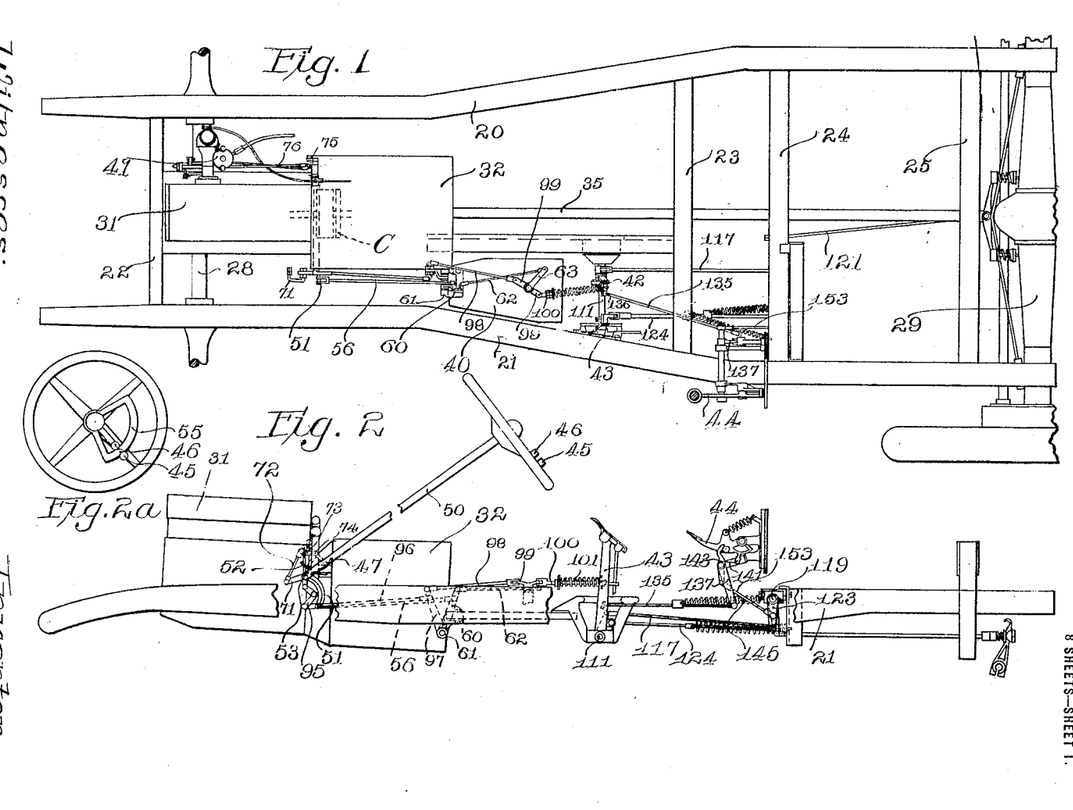

As shown in Figs. 1 and 2 the main frame of the vehicle comprises the usual channel members 20 and 21 united by the cross frame members 22, 23, 24, and 25. This frame structure is supported upon front and rear axles 28 and 29 by means of springs which may be connected in any well known manner, not illustrated. At the forward end of the chassis, and preferably supported upon a three point suspension, is a unit structure comprising a gasolene engine 31 and dynamo 32 united to one another by means of a housing, which incloses a clutch C, preferably of the electro-magnetic type. The dynamo shaft is permanently connected to the rear and driving axle by means of the propeller shaft 35, which is suitably united both at its forward and rear ends by means of universal joints, not illustrated. The body of the vehicle, not shown on the drawing, may be supported upon the main members 20, and 21 in the usual manner. This body is preferably provided with a compartment under the body seat or under the rear deck for receiving a set of storage batteries, not shown in the drawing.

Since the present specification relates particularly to the mechanical interconnecting links for the various controlling devices and to the system of control, of which these mechanical connecting links form a part, the parts of my vehicle just heretofore briefly described will not be described in detail, many modifications of these devices being possible without in any way departing from the spirit and scope of my invention.

Figure 14:
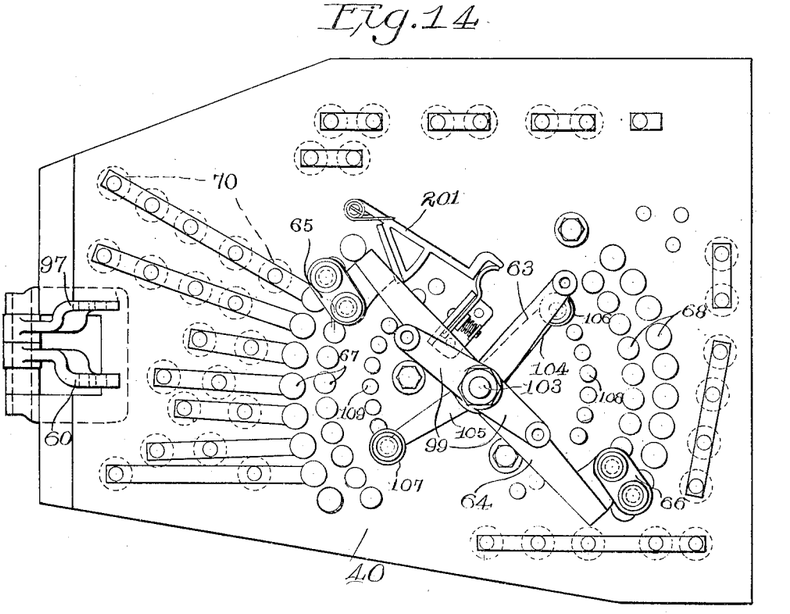
Fig. 14 is a top view of the resistance box and rheostat.
Figure 15:
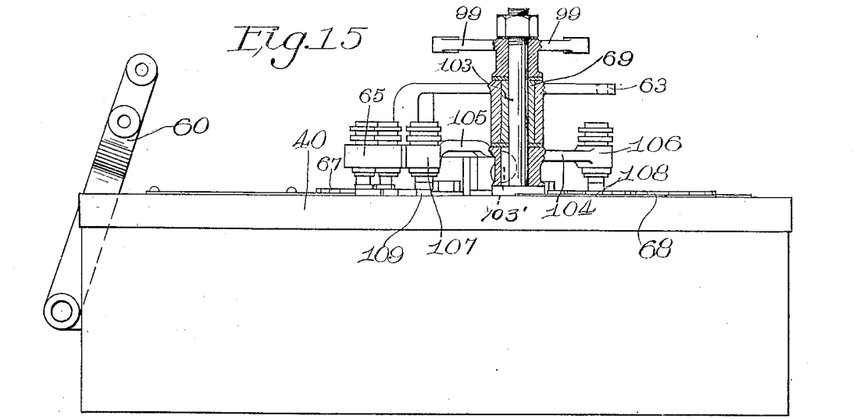
Fig. 15 is an elevation of the resistance box and rheostat.

The present invention is specifically directed to the mechanism for controlling the vehicle by means of the rheostat 40, carbureter 41, service brake pedal 42, emergency brake pedal 43, reversing pedal 44, dynamo controlling lever 45, engine controlling lever 46, clutch switches 47 and 52, and brake switches 48 and 49 and their interconnecting linkages and mechanisms. The hand lever 45 connects to a tubular operating shaft extending through the steering post 50, and by means of the mechanism illustrated in Figs. 17, 18, and 19, which will be described in detail later on, is arranged to move the lever 51 from its position, shown in Fig. 2, in a clockwise direction about the pivotal point 53 when the lever 45 is moved from its normal position along the quadrant 55. The movement of the lever 51 acts through the agency of the rod 56 upon the lever 60, this latter being pivoted upon the shaft 61. The lever 60 is connected by means of a link 62 with the main operating arm 63 of the field rheostat 40. The arm 63, as shown most clearly in Figs. 14 and 15, is rigidly connected with and, in fact, forms a part of the main rheostat brush carrying member 64. This member carries at its extreme ends two sets of brushes 65 and 66. The brushes 65 are arranged to travel in contact with the resistance connecting buttons 67, and the brushes 66 are arranged to travel in contact with the resistance connecting buttons 68. When the rod 62 is moved in a forward direction it causes the rotation of the brush carrying member 64 in a counter clock-wise direction about its supporting sleeve 69, thus causing the resistance units 70 to be included in the dynamo field circuit, one group at a time, so that the field magnetism will be gradually decreased.

Figures 3, 4:
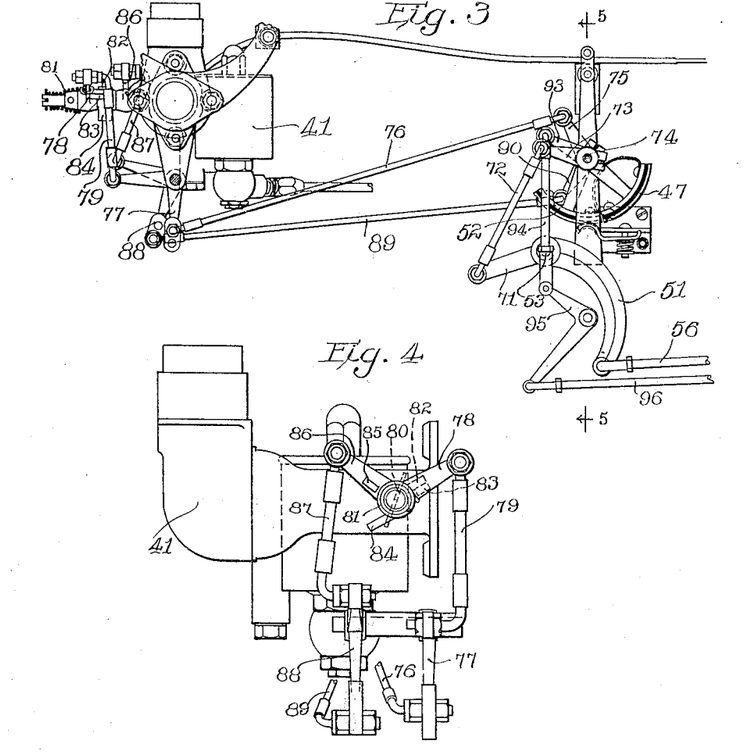
Fig. 3 is a side elevation of the carbureter and of the throttle and rheostat controlling levers and of the clutch switch.
Fig. 4 is a front elevation of the carbureter showing the throttle controlling mechanism.
Figure 5:
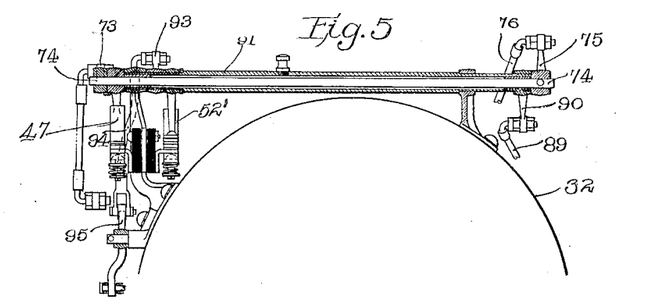
Fig. 5 is a section taken on the line 5—5 of Fig. 3, in the direction of the arrow, illustrating the cross-over mechanism for controlling the carbureter throttle.
Figures 17, 18, 19, 20, 21:
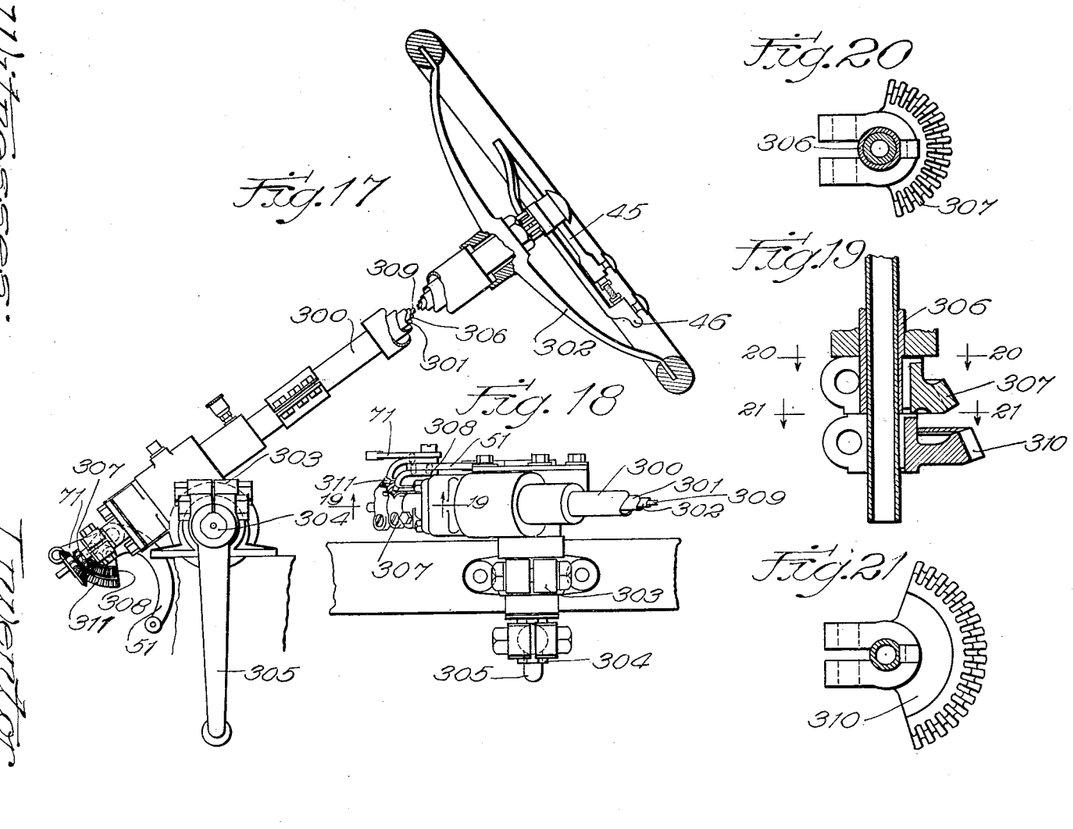
Fig. 17 is a side elevation of a steering column and mechanism associated therewith for controlling certain portions of my improved apparatus, portions of the steering wheel and column being broken away for the purpose of better illustration.
Fig. 18 is a partial elevation of the structure disclosed in Fig. 17.
Fig. 19 is an enlarged sectional detail taken on line 19—19 of Fig. 18.
Fig. 20 is a transverse section taken on line 20—20 of Fig. 19.
Fig. 21 is a transverse section taken on line 21—21 of Fig. 19.

The throttle controlling lever 46 is connected by means of a sleeve and the customary bevel gears, shown in Figs. 17, 18, and 19 with the arm 71 carried at the lower end of the steering column 50. The traveling end of the arm 71 is connected by means of a link 72 with the end of an arm 73, which is tightly fixed to the inner shaft 74 extending across from the left hand to the right-hand side of the engine at a point between the dynamo and the engine. The righthand end of the shaft 74 carries an arm 75 to the movable end of which is attached a link 76 which connects at its forward end with the lower end of a bell crank lever 77. The upper arm of this bell crank lever is attached to a throttle arm 78 of the carbureter by a link 79. The throttle 80, as viewed in Fig. 4, is caused to follow the movement of the arm 78 by the action of a spring 81 which holds a projection 82 on the throttle shaft in contact with a lug 83 on the arm 78. The throttle shaft also carries a second projection 84 which may be engaged by a lug 85 carried upon a second lever 86, to close the throttle against the action of the spring 81 when the lever 86 is rotated in a counterclockwise direction.

The free end of the arm 86 is connected by means of a link 87 with the upper free end of a bell crank 88. The lower free end of the bell crank 88 is connected by means of a link 89 with the free end of a lever 90, which is carried upon the right end of the rotatable sleeve 91 which extends across the vehicle between the engine and the dynamo, and which embraces the shaft 74. The left end of the sleeve 91 carries an arm 93, the free end of which is connected by a link 94 with the upper movable end of a bell crank 95. The lower movable end of the bell crank 95 is connected by means of a link 96 with the lever 97 pivoted upon the shaft 61, the upper end of this lever 97 being connected by means of a link 98 with one end of an arm 99 of the rheostat 40. The other end of the arm 99 is connected by a link 100 with the service brake pedal, this link 100 being surrounded by a spring 101 which presses forward upon the link 100 and abuts against the service brake lever 42 in such a manner as to permit the service brake lever to continue its movement forward after the link 100 has reached the forward end of its forward stroke.

The two sets of carbureter controlling linkages and levers just described permit the operator to set the hand throttle lever 46 in any desired position to control the maximum open position of the engine throttle and permit the operator to close the engine throttle to any desired degree by a forward movement of the service brake pedal. The removal of the foot from the service brake pedal permits the engine throttle to return to its position under the action of its spring 81 as controlled and determined by the hand throttle lever 46.

The lever 99 of the field rheostat, which is included in the linkages between the service brake pedal 42 and the engine throttle, is carried upon a rod 103 the lower end of which carries the brush arms 104 and 105 secured thereto by means of a key 103′ in a manner which causes the arms 104 and 105 to rotate with the arm 99. The arms 104 and 105 carry brushes 106 and 107 at their extremities, these brushes being arranged to travel over resistance terminals 108 and 109 which are connected in parallel with the resistance terminals 68 and 67, respectively, over which the brushes 66 and 65, respectively, travel. This arrangement permits an operator to eliminate field resistances from the shunt field of the dynamo by the movement of the service brake pedal, thus applying a dynamic braking effect to the vehicle simultaneously with the mechanical closure of the engine throttle and without disturbing the antecedent speed controlling positions of the field rheostat arm 64 or the engine throttle.

The service brake pedal 42 has still further functions, one being that of applying mechanical brakes to the rear wheels of the vehicle. This service brake lever is mounted upon a supporting shaft 111 supported from the vehicle frame by suitable brackets 112 and 113. Also mounted upon the shaft 111 is an arm 114 which carries a lug 115 adapted to be engaged by a lug 116 carried by the service brake pedal 42 when the pedal is moved in its forward direction under the pressure of the foot. The upper end of the arm 114 is connected by means of a link 117 with a depending arm 118 carried upon a cross shaft 119. The arm 118 is provided with a second downwardly projecting limb 120 to the end of which the brake operating link 121 is attached. It is not deemed necessary to describe the operation of the mechanical braking parts which perform the actual function of gripping the brake drums since these may be of any well known type, and since they are operated by the forward movement of a rod the same as is true of many well known types of automobile brakes.

Figures 9, 10:
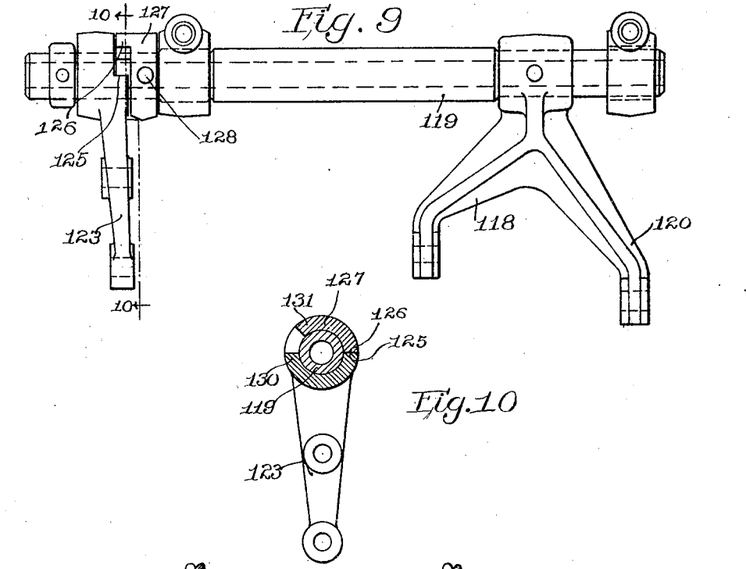
Fig. 9 is a rear view of the intermediate shaft for operatively connecting the service and emergency brake pedals with the brake bands.
Fig. 10 is a section taken on the line 10—10 of Fig. 9 in the direction of the arrow.
Figure 11:
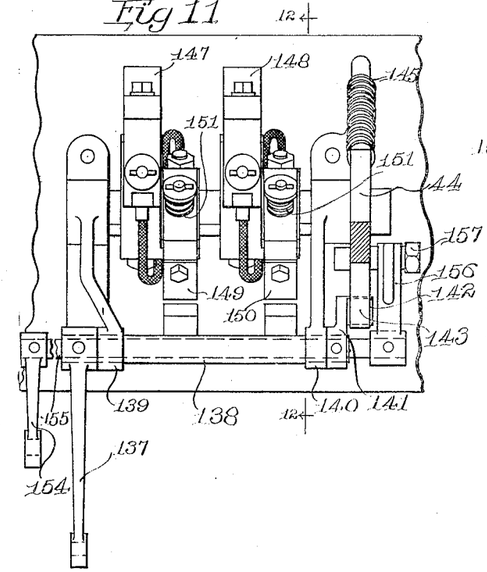
Fig. 11 is a front elevation of the reversing switch.
Figure 12:
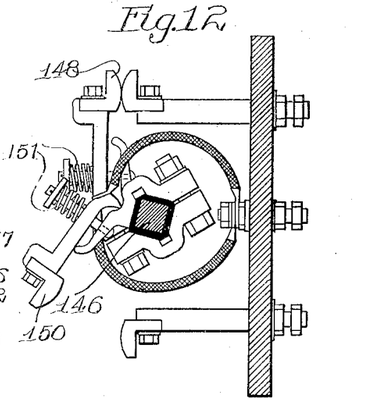
Fig. 12 is a section taken on the line 12—12 of Fig. 11.
Figure 13:
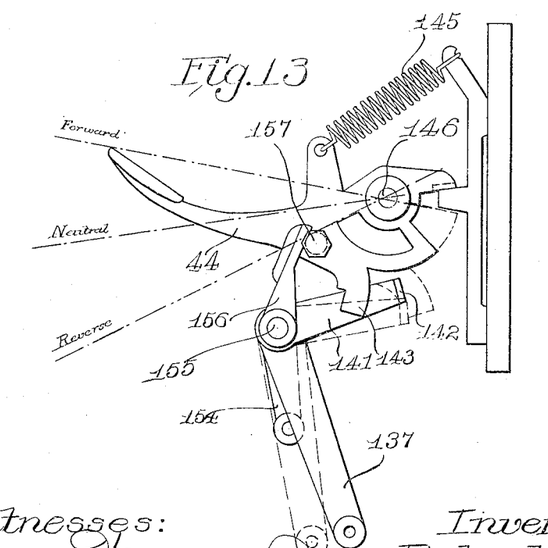
Fig. 13 illustrates the operating and interlocking mechanism for the reversing switch.

The cross rod 119, which supports the limbs 118 and 120, is mounted in the cross frame channel 24 and is provided at its left end with a depending arm 123 which is connected by a link 124 with the emergency brake pedal 43. The forward movement of the emergency brake pedal causes the arm 123 to move in a counter clockwise direction (see Fig. 10) whereupon the shoulder 125 on the hub of the arm 123 engages the shoulder 126 on the sleeve 127 which is secured to the shaft 119 by means of the pin 128. Sufficient play is allowed between the shoulders 130 and 131 of the arm 123 and collar 127 to permit the operation of the service brake, and the consequent rotation of the shaft 119, without moving the emergency brake. When the emergency brake is moved forward the shaft 119 is caused to rotate and the arm 118 consequently causes the link 117 to be moved forward, but the service brake is not correspondingly moved because of the arrangement of lugs 115 and 116 on the service brake arm 114 and the service brake lever 42.

Another function of the service brake is to prevent the movement of the reversing switch lever 44 from its forward to its reversing position, or from its reversing to its forward position when the service brake pedal is in normal. It is, in fact, necessary that the service brake pedal be depressed to a position in which all of the starting resistance has been excluded from the shunt field circuit and in which the throttle of the engine is closed to idling position before the reversing switch can be changed from either of its circuit closing positions to the other circuit closing position. This function is accomplished by means of a link 135 which connects between a lug 136 on the service brake 42 and the movable end of the bell crank lever 137 of the reversing switch mechanism. This lever 137 is carried upon a sleeve 138 which is rotatably mounted in brackets 139 and 140, and which carries at its other extremity an arm 141 which acts as a locking stop for the foot lever 44 of the reversing switch. The end of the arm 141 is provided with a laterally extending stop portion 142 adapted to engage either the forward or the rear faces of the downwardly projecting lug 143 carried by the foot pedal 44. When the arm 137 is moved in a forward direction, by the forward movement of the service brake, the reversing pedal 44 may be depressed to reversing position in which position it will be locked by the return of the lever 137 to its rearward position. When it is desired to change the reversing switch back to its forward circuit closing position it is only necessary to press the service brake, thus pulling the stop member 142 out of engagement with the forward face of the lug 143 and permitting the reversing switch to be moved to its forward position through the action of the spring 145.

The details of the circuit closing portions of the reversing switch form no part of the present invention and will, therefore, be described only in a general way. The foot lever 44 is mounted upon the square shaft 146 upon which are also mounted four contactors 147, 148, 149, and 150, these contactors being electrically insulated from the shaft 146 and being spring mounted so that they make contact with their registering circuit members with tensions as individually applied by the separate springs 151.

The main circuit of my vehicle is controlled in the ordinary operation by an electro-magnetic switch and, in order that this electro-magnetic switch may not be inadvertently closed by some accidental closure of the electric circuit controlling that switch, whereupon the vehicle might be inadvertently started at a time when it is not intended that it should be started, I have provided means for moving the reversing switch out of its contacting position through the agency of the emergency brake so that when the emergency brake is set, as it should be whenever the vehicle is left by the operator, the dynamo circuit will be positively opened at the contacts of the reversing switch. The mechanism for accomplishing this function comprises a link 153 extending between the middle portion of arm 123 carried upon the cross shaft 119 and the free end of lever 154, which depends from the shaft 155 of the reverse switch mechanism, said shaft passing through the sleeve 138, heretofore described. The shaft 155 also carries an arm 156 which extends upwardly and engages a roller 157 carried upon the reverse switch foot lever 44, the arrangement being such that the pressure of the free end of lever 156 against the roller 157 causes a sufficient movement of the reversing switch to separate the contacts 147 and 148 from their normal circuit closing positions, but such that the depression of the reversing switch foot pedal 44 will not have a counter control upon the emergency foot brake lever because the roller 157 will move away from the lever 156 under the latter circumstances.

Figures 6, 7:
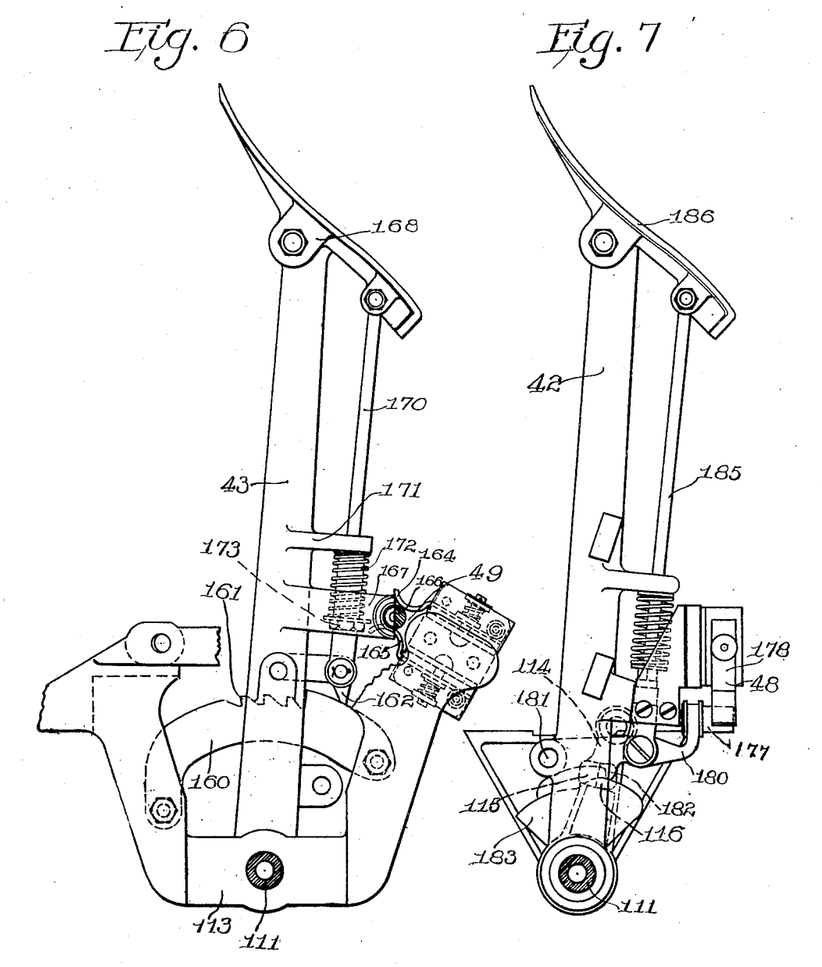
Fig. 6 is an elevation of the emergency brake lever mechanism.
Fig. 7 is an elevation of the service brake.

Fig. 6 illustrates the emergency brake structure. The lever 43 is pivoted to the frame 113, the sleeve or lever 43 being rotatable upon the shaft 111. A ratchet member 160 extends between the opposite limbs of bracket 113, and has its upper edge provided with teeth 161 in which the pawl 162 engages for holding the brake lever 43 in its forward position. It will be noted that the first locking position of the emergency brake lever 43 occurs after a very appreciable forward movement of the lever, the purpose of this being to insure the complete opening or closing of the reversing switch and to prevent a poor connection between the contacts of that switch, such as might occur after the parts and linkages had become somewhat worn, if the ratchet teeth were arranged throughout the entire length of the ratchet member 160.

A switch 49 is arranged for closure when the brake lever 43 is in its normal position. This switch comprises two members 164 and 165, which form the two terminals of an electric circuit, and with a third conducting member 166, which is insulatedly mounted upon the arm 167, and is arranged to press between the spring contact members 165 and 164 to close the electric circuit between them when the lever 43 is in normal position. The purpose of this switch is to open the circuit of the controlling relay of the electric system in a manner to be later described. The pawl 162 is controlled by a pivoted foot member 168, which operates a rod 170 passing through the lug 171. A spring 172 abuts the lug 171 and presses upon an adjustable stop 173 on the rod 170, so as to maintain this pawl 162 continually under pressure against the ratchet member 160.

Figure 8:
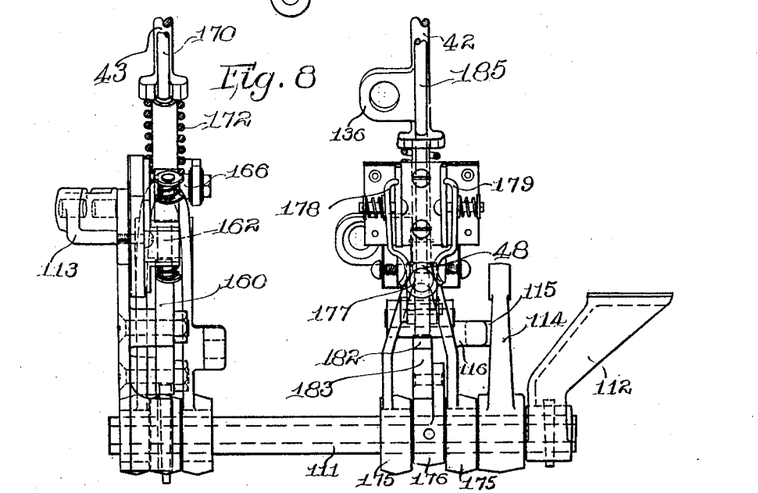
Fig. 8 is an assembly of the service and emergency brakes upon their supporting shaft as viewed from the rear.

The service brake illustrated in Fig. 7 is also loosely carried upon the shaft 111. The pivotal portion of the lever is divided into two arms, each of which has a collar 175, these being positioned one on each side of the part 176, which is rigidly secured to the shaft 111. The switch 48 is operated by the metal conducting part 177, which is arranged to pass between the switch members 178 and 179, shown particularly in Fig. 8. The member 177 is insulatedly mounted upon an arm 180, which is pivoted at 181 upon the lever 42. (See figure.) The arm 180 carries a downwardly projecting stop 182, which rides upon the upper surface of the cam 183, which cam is mounted upon the arm 176, and is therefore stationary. The lever 180 is operated by the downward movement of the rod 185 controlled by the foot piece 186. It is impossible, however, to depress the heel of the foot piece before the lever 42 has been moved forward through about fifteen degrees, or until the stop 182 has passed above the depressed portion of the cam 183. The switch members 178 and 179 move with the lever 42, so that the switch 48 is operated only by the foot piece. As will be hereafter pointed out, the switch 48 is in circuit with the main circuit relay coil. Therefore, an operator may, by tilting the foot which rests upon the service brake forward and backward, open and close the switch 48, and therefore open and close the main operating circuit of the vehicle.

Figure 16:
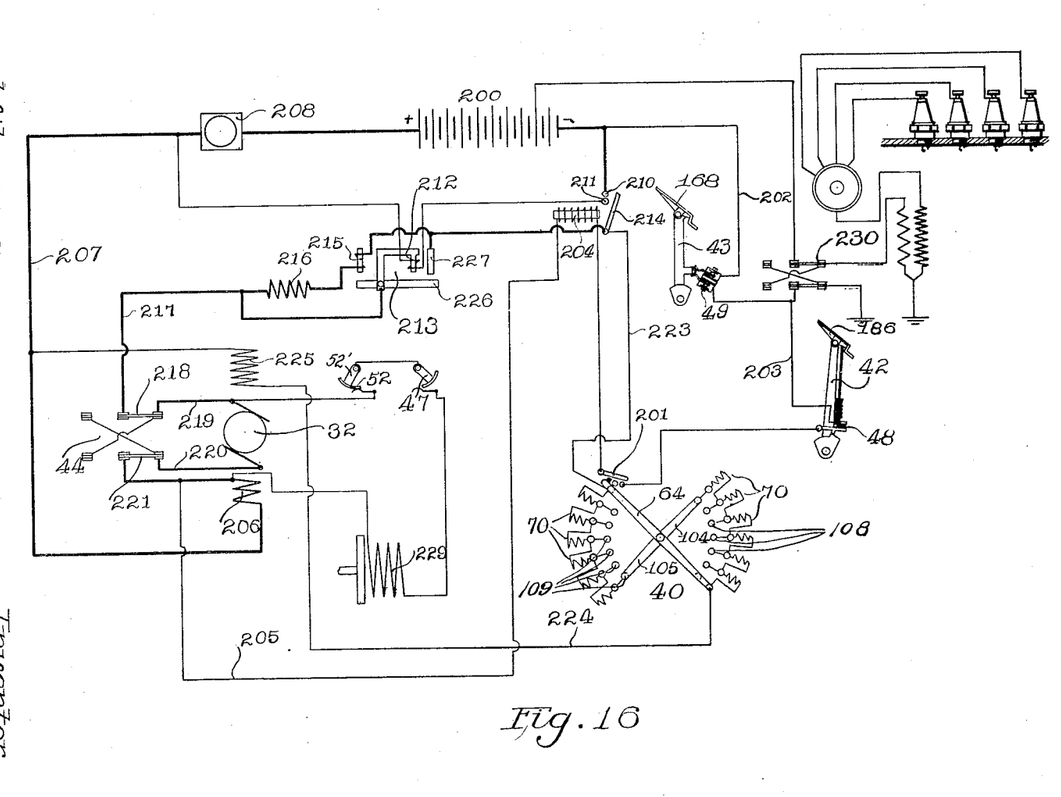
Fig. 16 is a diagrammatic illustration of the power and ignition circuits of the vehicle shown in association with diagrammatically illustrated controlling mechanism.

The circuit shown in Fig. 16, and not specifically claimed herein, comprises a main battery 200, together with switches and conductors for completing the starting and controlling circuits of the vehicle. This circuit will best be understood by first tracing the operation which occurs in the normal starting of the vehicle from rest. The movement of the hand lever 45 causes the counter-clockwise rotation of the arm 64 of rheostat 40. The first movement of this arm causes the closure of switch 201, which completes a circuit from the negative pole of battery 200, through conductor 202, switch 49, conductor 203, switch 48, switch 201, the coil of main relay 204, conductor 205, series winding 206 of the dynamo 32, conductor 207, meter 208, to the positive pole of battery 200. The current in this path causes the actuation of relay 204. The actuation of this relay completes three circuits; the first from the negative pole of battery 200 through contacts 210 and 211 of relay 204, the winding 212 of relay 213, and the meter 208, to the positive pole of battery 200; the second from the negative pole of battery 200 through contacts 210 and 214 of relay 204, winding 215 of relay 213, resistance 216, conductor 217, arm 218 of reversing switch 44, conductor 219, the armature of dynamo 32, conductor 220, arm 221 of reversing switch 44, series winding 206 of dynamo 32, conductor 207, and meter 208 to the positive pole of battery 200; and the third from the negative pole of battery 200, through contacts 210 and 214 of relay 204, through conductor 223, arm 64 of rheostat 40, conductor 224, shunt winding 225 of dynamo 32, conductor 207 and meter 208 to the positive pole of battery.

The result of the closure of these three circuits is that the shunt dynamo field 225 immediately becomes fully energized, there being none of the resistances 70 of the rheostat 40 at this time included in its circuit. The current through the dynamo armature is initially very large, because the dynamo is not rotating, and there is consequently no counter-electro-motive force. The flow of current through the armature of the dynamo is limited, however, by resistance 216, which is initially included in the starting circuit. Notwithstanding the inclusion of this resistance, a very large current flows, and this is sufficient to magnetize the winding 215 of relay 213 to such an extent that the armature 226 of that relay is held in its normal position in spite of the energization of the coil 212 of that relay.

As the dynamo armature increases in speed, the counter-electro-motive force of the dynamo causes a decrease in current, until that flowing through magnet 215 is insufficient to prevent the current in magnet 212 from causing that magnet to attract the armature 226. When armature 226 is attracted, it closes circuit with contact 227, which completes a shunt about the resistance 216 and the coil 215 of relay 213. When this occurs, the entire voltage of the battery is connected across the dynamo armature and series field, and the speed is controlled, therefore, by the energization of the shunt field winding 225.

As the lever 45 is moved, the rheostat arm 64 progresses over its contacts 67 and 68, causing the inclusion of various ones of the coils 70 in the shunt field circuit, thus decreasing the field magnetization and causing an increased speed of the dynamo. After the vehicle is brought up to a speed of seven or eight miles an hour, it is usually desired that the gasolene engine will be cut in so as to assist in driving the vehicle. This is accomplished by the movement of lever 46 along the segment 55 of the operator's hand wheel. The first movement of this arm or lever 46 causes the closure of the switch 47, which is included in circuit with the clutch magnet coil 229. At the same time, or preferably prior to the movement of the arm 46, the ignition switch 230 is closed so that when the gasolene engine is rotated by the closure of the electro-magnetic clutch through the energization of its winding 229, the engine immediately begins adding its power to that of the dynamo, the amount of power added by the engine depending upon the degree of movement of arm 46 which controls the engine throttle. It will be noted that the clutch winding 229 is connected in circuit between one pole of the dynamo armature, and a common point of the reversing switch. By this arrangement, when the reversing switch is thrown so as to drive the vehicle backward, no current passes through the clutch winding and the clutch becomes inoperative, thus preventing a reversal of the direction of rotation of the gasolene engine.

If, during the operation of the vehicle, it is desired that the greater portion of the power be taken from the gasolene engine, the arm 64 of the rheostat 40 is moved in a clockwise direction until the field of the dynamo becomes strengthened to such an extent that the rotation of the dynamo by means of the gasolene engine causes the dynamo to serve as a generator and thus charge the storage battery 200. In the operation of the vehicle, it is customary to set the gasolene engine throttle to a substantially wide open position, and to thereafter control the speed almost wholly by means of the dynamo lever. If it is desired that the vehicle be driven slowly, most of the power created by the gasolene engine will be taken up by the dynamo in recharging the battery 200. If it is desired that the vehicle be propelled at high speed, it may be necessary to utilize some of the power of the dynamo in the propulsion of the vehicle, in which case the field will be weakened and the dynamo will operate from the storage battery as a motor in helping to propel the vehicle.

The system of my invention provides means for storing up the energy which is usually lost in braking the vehicle in slacking its speed. This will ordinarily be done by the depression of the service brake lever 42. This lever is mechanically connected with the arm 104, 105 of the rheostat 40, so that the forward depression of the lever 42 causes the arm 104, 105, to rotate in a clockwise direction, thus eliminating the resistances 70 two by two as the arm moves over its contacts. No dynamic braking is produced by the movement of this arm until it has passed the position at which the arm 64 is set, but as soon as the arm 104, 105 makes connection with contacts further advanced in a clockwise direction from the arm 64, the field of the dynamo becomes increased, whereby it is caused to act as a generator and absorb power from the moving vehicle. The service brake pedal 42, as has been heretofore pointed out, is also mechanically connected with the engine throttle, so that the first forward movement of the brake pedal 42 causes a closure of the engine throttle to an idling position. This operation prevents the engine from delivering power at the time the speed of the vehicle is being slackened by the application of the service brake. As has been heretofore pointed out, the service brake does not begin its mechanical braking effects until the arm 104, 105 has been moved in a clockwise direction to substantially its last effective position. If an operator has set both the dynamo controlling hand lever 45 and the throttle controlling hand lever 46 to a proper position for giving the vehicle the desired speed, and also for charging or discharging the main battery at the desired rate, then, by means of the service brake pedal 42 and the foot member 186 thereof, an operator may bring the vehicle to an absolute standstill and again start up without disturbing the position of either the gas or electric controlling levers. After the foot pedal 42 has been pressed forward through a part of its movement, the operator's heel may be depressed to cause the opening of switch 48 forming a part of the service brake mechanism. When this occurs, the circuit of the main relay 204 is interrupted, and that relay falls back to its normal position the same as occurs when the switch 201 is opened by the return of the arm 64 of the rheostat to its normal position. By the mere removal of the foot from the service brake pedal the vehicle will again assume the same speed and charging or discharging conditions as it had before the service brake was depressed. Associated with the mechanism which causes the closure of the engine throttle when the service brake pedal 42 is pressed forward, is a switch 52, the movable element 52′ which is secured to the sleeve 91, and so arranged as to interrupt the clutch circuit just when the service brake pedal is operated, so that if the vehicle is brought to a standstill by the movement of the service brake pedal, the engine will nevertheless continue to idle until the vehicle is again started, thus preventing a slight retardation of movement which is noticeable when the engine is started from rest by the first closure of the circuit of the electro-magnetic clutch.

The emergency brake lever 43 controls a switch 49 which is included both in the circuit of starting relay 204 and in the circuit of the engine ignition apparatus. When the emergency brake is depressed, neither the engine nor the dynamo may be operated because of the opening of the switch 49. As has been heretofore pointed out, the emergency brake 43 is also mechanically connected with the dynamo reversing switch 44 in a manner which causes the opening of the contacts of the reversing switch whenever the emergency brake is depressed.

In order to drive the vehicle in the reverse direction, the reversing switch 44 is actuated by the left foot of the operator. The vehicle is then propelled in the reverse direction, slowly, by the dynamo operating as a motor. The vehicle may be controlled by the hand lever 45 or by the movement of the service brake lever 42, the latter being the preferable method, since it is usual, in backing a vehicle, that the foot should be in position on the service brake so that the vehicle can be quickly stopped. This will be done, of course, by the depression of the heel of the operator, which opens switch 48 the same as though the vehicle were being propelled in a forward direction.

I will now describe the means by which the levers 51 and 71 are controlled by means of the levers 45 and 46. Referring to Figs. 17 to 21, inclusive, the reference character 300 indicates the steering column of usual construction, in which is rotatably mounted a tubular member 301 connected at its upper end with the steering wheel 302. At its lower end the tubular member 301 is provided with a worm, not shown, which meshes with a worm gear 303 secured to a shaft 304, to one end of which is connected the crank 305 that connects with the steering link in a well known manner. Mounted within the tubular member 301 is a second tubular member 306 which is connected at its upper end with the lever 46, and carries at its lower end a bevel gear 307. This gear meshes with the dished bevel gear 308 which is secured to one end of the arm 51 as shown in Fig. 18. When the lever 46 is moved about its axis its motion is communicated through the tubular member 306 and through the gears 307 and 308 to the lever 51.

Rotatably mounted within the tubular member 306 is a third tubular member 309 to the upper end of which is secured the lever 45, and to the lower end of which is keyed the gear 310. The gear 310 meshes with the second dished bevel gear 311 which is riveted to the lever 71 as shown in Fig. 18. When the lever 45 is moved about its axis its motion is communicated through the tubular member 309 and the gears 310 and 311 to the arm 71, thereby rocking the latter arm about its axis.

By watching the meter, an operator can readily maintain his battery in its proper degree of charge, and thus prolong the life of the storage battery to many times that which it ordinarily has in the operation of electric motor vehicles.

Having thus described my invention, what I claim as new and desire to secure by Letters Patent of the United States is:

1. A controlling mechanism for mixed drive vehicles comprising the combination of an engine and a dynamo adapted to function either as a motor or a generator, a throttle for the engine, a shunt field circuit for the dynamo, a rheostat for controlling the shunt field circuit to cause said dynamo to function as a generator, a foot pedal and mechanism by which the depression of said foot pedal moves the throttle toward its position of closure and moves said field rheostat toward its position of decreased resistance, and a circuit through which said dynamo can send current while functioning as a dynamo, whereby said dynamo acts to stop the vehicle.

2. Controlling mechanism for mixed drive vehicles comprising in combination an engine and a dynamo, a throttle for the engine and a field rheostat for the dynamo, a mechanical brake for the driven part of the vehicle, a foot pedal and link and lever mechanism connecting said foot pedal with said field rheostat, said engine throttle and said mechanical brake, by means of which the depression of said foot lever closes the engine throttle, excludes resistance from said rheostat and applies said mechanical brake.

3. A controlling mechanism for mixed drive vehicles comprising in combination an internal combustion engine and a dynamo of an electro-magnetic clutch for uniting the shaft of the engine with the shaft of the dynamo, a throttle for the engine, a controlling rheostat for the dynamo, a switch in the circuit of said electro-magnetic clutch link mechanism for opening said switch when the engine throttle is closed, an arm for said rheostat, link mechanism extending between the arm of said rheostat and the throttle for said engine, whereby the engine throttle may be moved by the movement of the arm of said rheostat and a foot pedal for moving the arm of said rheostat, the depression of said foot pedal from normal serving to exclude resistance from the rheostat circuit close the engine throttle and open the switch for said electro-magnetic clutch.

4. Controlling mechanism for mixed drive vehicles comprising an engine and dynamo and an electro-magnetic clutch for directly uniting the engine and dynamo shafts, a throttle for the engine, a controlling rheostat for the dynamo, a switch for the electro-magnetic clutch and a mechanical brake for the driven parts of the vehicle, a foot pedal and link and lever mechanism connecting said foot pedal with the mechanical brakes, the field rheostat, the engine throttle and the electro-magnetic clutch switch, so that the depression of said foot pedal causes the closure of the throttle, the opening of the switch, the exclusion of resistance from said controller and the setting of the mechanical brakes.

5. Controlling mechanism for vehicles driven by an internal combustion engine and a dynamo comprising a foot brake adapted to dynamically retard said dynamo and mechanically retard the driven parts of the vehicle, and an engine throttle mechanically connected with said foot brake, whereby the throttle is closed upon the actuation of the foot brake.

6. Controlling mechanism for vehicles which are driven by the mixed power from an internal combustion engine and a dynamo, a shunt field circuit for the dynamo, a resistance in circuit with the shunt field of the dynamo, a pair of movable arms for controlling the inclusion and exclusion of said resistances in the shunt field circuit, a hand lever for moving one of said arms and a foot pedal for moving the other of said arms, whereby the speed of the vehicle may be controlled by either the hand lever or the foot pedal.

7. Controlling mechanism for vehicles having an internal combustion engine, a dynamo and a storage battery for propelling the vehicle, comprising a main reversing switch in the circuit of the dynamo armature, a foot pedal for operating said switch, a lock for normally preventing said foot pedal from being moved through a sufficient distance to reverse said switch, a foot brake for the vehicle, mechanism connecting said lock with said foot brake and adapted to release the lock when the foot brake is depressed, so that the reversing lever may be moved from its forward position to its reversing position when the foot brake is operated.

8. Controlling mechanism for vehicles having an internal combustion engine, a dynamo and a storage battery for propelling the vehicle, comprising a main reversing switch in the circuit of the dynamo armature, a foot pedal for operating said switch, a lock for normally preventing said foot pedal from being moved through a sufficient distance to reverse said switch, a speed controlling lever for the dynamo, a foot brake for the vehicle, mechanism connecting said lock with said foot brake and adapted to release the lock when the foot brake is depressed, so that the reversing lever may be moved from its forward position to its reversing position when the foot brake is operated, said lock serving also to prevent the reversing lever from returning to its normal position excepting upon the depression of the foot brake pedal.

9. Controlling mechanism for vehicles having an internal combustion engine, a dynamo and a storage battery for propelling the vehicle, comprising a main reversing switch in the circuit of the dynamo armature, a foot pedal for operating said switch, a lock for normally preventing said foot pedal from being moved through a sufficient distance to reverse said switch, a speed controlling lever for the dynamo, a foot brake for the vehicle mechanism, connecting said lock with said foot brake and adapted to release the lock when the foot brake is depressed, so that the reversing lever may be moved from its forward position to its reversing position when the foot brake is operated, said lock serving also to prevent the reversing lever from returning to its normal position excepting upon the depression of the foot brake pedal, and spring means for returning the reversing switch and pedal to its normal or forward driving position when the foot brake pedal is depressed.

10. Controlling mechanism for vehicles provided with an engine, a dynamo and an electro-magnetic clutch for uniting the shafts of the engine and dynamo, comprising a throttle for the engine, revoluble means for operating said throttle, a lever carried upon said means, a switch in the circuit of said electro-magnetic clutch, a lever extending between said revoluble means and an operating part of said switch, said switch having coöperating sliding contact members so arranged that the switch may be closed upon the first movement of the revoluble means and whereby the closure of the switch will not interfere with the further movement of the revoluble means.

11. In a motor vehicle provided with an engine and dynamo for propelling the vehicle, a clutch for uniting the engine and dynamo, a pair of switches serially included in the circuit of said clutch, a hand lever for opening the engine throttle, said lever controlling one of said switches, whereby the switch will be closed when the throttle is opened, a foot lever for controlling the engine throttle, and arranged to close the throttle when the foot lever is depressed, said foot lever controlling the second of said switches and arranged to open said switch when the throttle is closed by the foot lever.

12. In a motor vehicle, the combination with a dynamo and storage battery for propelling the vehicle, an electrically operated main switch in the circuit of the dynamo and storage battery, a reversing switch in the circuit of the dynamo and storage battery, a foot brake, a switch controlled by said foot brake in circuit with the controlling coil of said electrically controlled main switch, link mechanism between said foot brake and said reversing switch, whereby the circuit of the electrically controlled main switch is opened and the reversing switch is thrown into neutral position by the depression of said brake pedal, and mechanical braking means also set by the depression of said brake pedal.

In witness whereof, I hereunto subscribe my name this 9th day of July, A. D. 1917.

ROLAND S. FEND.

Witnesses:
MARY A. COOK,
LAMAR MIDDLETON.